W. J. NIST & W. G. ERTEL.
SPRING WHEEL.
APPLICATION FILED AUG. 18, 1917.
1,274,190.
Patented July 30, 1918.
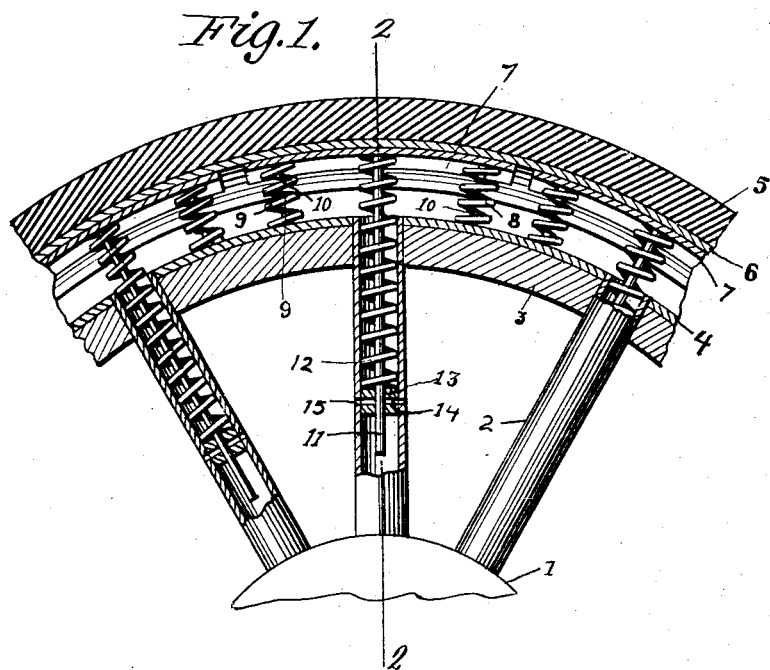
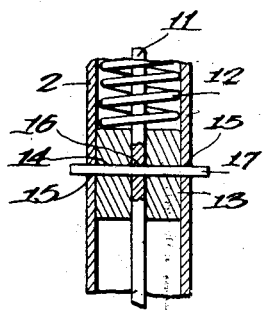
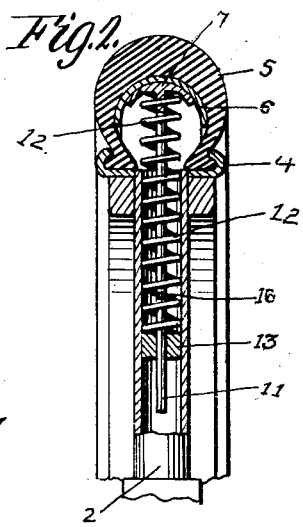
INVENTOR
William J. Nist.
William G. Ertel
WITNESSES

UNITED STATES PATENT OFFICE.

WILLIAM J. NIST AND WILLIAM G. ERTEL, OF PITTSBURGH, PENNSYLVANIA.

SPRING-WHEEL.

1,274,190.  Specification of Letters Patent.  Patented July 30, 1918.

Application filed August 18, 1917. Serial No. 186,850.

*To all whom it may concern:*

Be it known that we, WILLIAM J. NIST and WILLIAM G. ERTEL, citizens of the United States, residing at Pittsburgh, in the county of Allegheny and State of Pennsylvania, have invented certain new and useful Improvements in Spring-Wheels, of which the following is a specification.

This invention relates to new and useful improvements in a wheel for vehicles, and the principal object of the invention is to provide a series of springs to replace the usual air tube.

Another object of the invention is to provide segmental plates located within the tire and spring means for holding the plates against the inner circumference of the tire.

A further object of the invention is to provide a stem on each plate adapted to receive the spring means and to make the spokes hollow to receive the stem and spring.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings, wherein like characters denote like or corresponding parts throughout the several views, and in which:—

Figure 1 shows part of a wheel supplied with our invention, parts being shown in section.

Fig. 2 is a sectional view on line 2—2 of Fig. 1.

Fig. 3 is a sectional detail of one of the spokes and the parts associated therewith, showing the elements on a larger scale, the cushioning means being compressed and the retaining pin in position.

In these figures, 1 represents the hub of a wheel, 2 the spokes, and 3 the felly. This wheel is supplied with the tire receiving rim 4 to receive the rubber tire 5 as is usual.

Instead of using an inner air tube we use a hoop of metal 6, trough shape in cross section and fitting in the outer half of the tire. We also provide a series of segmental plates 7, of trough shape in cross section but of less width than the hoop 6, and these plates are held pressed against the hoop by means of a pair of coil springs 8 and 9, one being adjacent each end of the segmental plate and held in place by means of projections 10 arranged, respectively, on the said segmental plate and on the rim 4. We provide each segmental plate with a stem 11, and we form the spokes 2, hollow to receive said stems and the spring 12 carried by said stem and compressed between the segmental plate 7 and the plate 13 secured in the hollow spoke and provided with an opening through which the end of the stem passes. It will be seen that the stem is arranged centrally on the segmental plate between the spring 8 and the spring 9, and these springs will force the segmental plate against the hoop, thus the tire 5 being held in its extended position. The plate 13 is provided with a hole 14 which registers with the hole 15 in the spoke, and the stem is provided with a hole 16 which is adapted to receive a pin 17 passing through the spoke and plate to hold the spring compressed and the segmental plate out of engagement with the hoop.

When the tire is to be removed or replaced, any suitable kind of clamp may be used to depress the segmental plate so that the pin may be passed through the holes 15 and 16 to hold the segmental plate out of engagement with the hoop, then the tire may be removed and a new one replaced without interference of the part of the springs or segmental plates. After the new tire has been put on the pins will be knocked out and the springs will force the segmental plates into contact with the metal hoop. It will be understood that the purpose of the metal hoop is to prevent the segmental plates from engaging directly with the material of the tire and thus wear out the same.

It will be seen that the springs will hold the tire in expanded position, the same as if the tire were provided with an inner tube and as the springs will allow a certain amount of movement of the tire said tire will be resilient enough to absorb shocks and thus make easy riding of the vehicle.

It is thought from the foregoing that the advantages and novel features of our invention will be readily apparent.

We desire it to be understood that we may make slight changes in the construction and in the combination and arrangement of the several parts, provided that such changes fall within the scope of the appended claims.

We claim as our invention:—

1. In a spring wheel comprising relatively inner and outer members having cushioning elements between them, tubular members extending radially inward from the inner member and having lateral openings, and members extending inward from the outer member and telescoping with the said tubular members and having openings to register with the lateral openings thereof to receive pins to hold the cushioning elements compressed, substantially as and for the purpose specified.

2. In a spring wheel, an annular member, a plurality of elements disposed about the annular member and spaced therefrom, cushioning means between the annular member and the outer elements, tubular members extending radially inward from the annular member and provided in their sides with openings, and rods extending inward from the said elements and telescoping with the tubular members, and having openings to register with the openings of said members to receive pins and hold the cushioning means compressed.

3. In a spring wheel, an annular member, hollow spokes extending inwardly from the annular member, an outer annular member, a plurality of plates disposed against the inner side of the outer annular member, rods projecting inwardly from the plates and telescoping with the spokes, cushioning means between the plates and inner annular member, and other cushioning means mounted upon the rods and confined between the plates and spokes, there being openings in the rods and spokes in position to register for receiving pins to hold the cushioning means compressed.

In testimony whereof we affix our signatures in presence of two witnesses.

WILLIAM J. NIST.
WILLIAM G. ERTEL.

Witnesses:
WALTER S. ESWEIN,
CHARLES LAVUS.

Copies of this patent may be obtained for five cents each, by addressing the "Commissioner of Patents, Washington, D. C."